Feb. 2, 1960 R. A. RUNYAN 2,923,893
AUTOMATICALLY STABILIZED OSCILLATOR CIRCUITS
Filed May 1, 1957 2 Sheets-Sheet 1
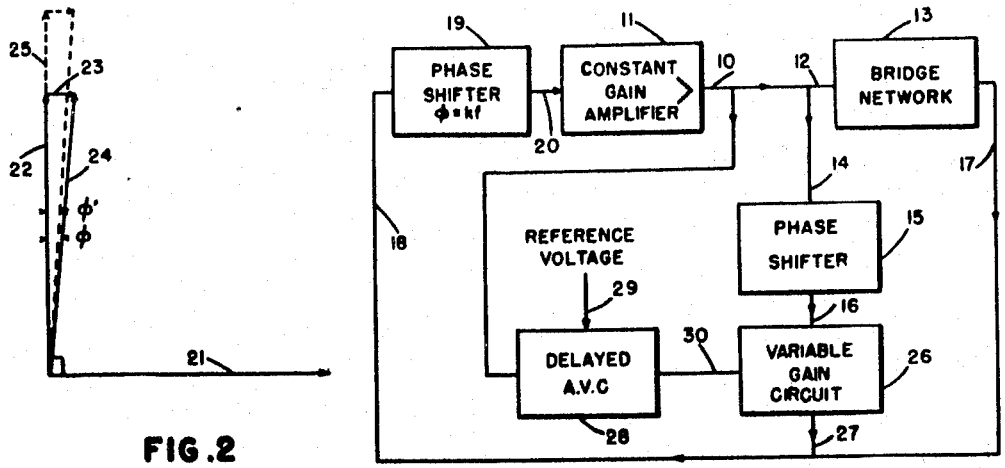
FIG.2
FIG.1
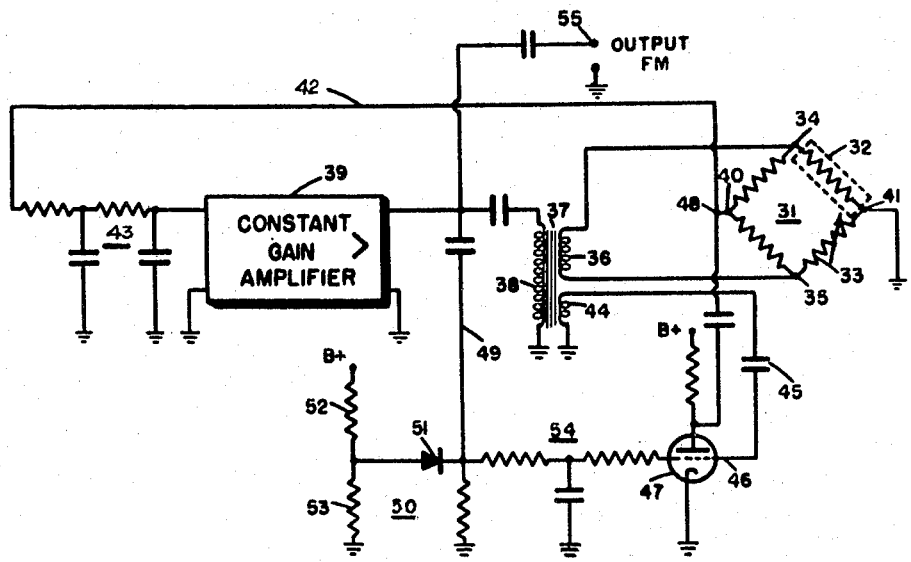
FIG.3
*INVENTOR.*
RAYMOND A. RUNYAN
BY
HIS ATTORNEY Feb. 2, 1960 R. A. RUNYAN 2,923,893
AUTOMATICALLY STABILIZED OSCILLATOR CIRCUITS
Filed May 1, 1957 2 Sheets-Sheet 2
FIG. 4
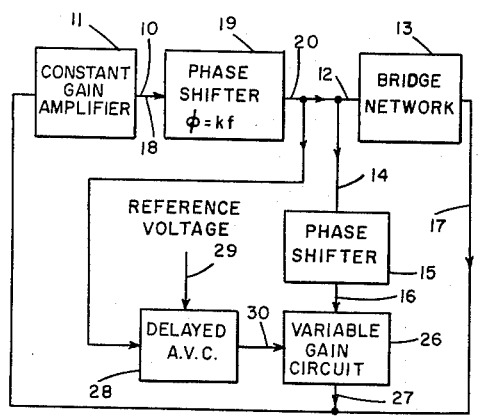
FIG. 5
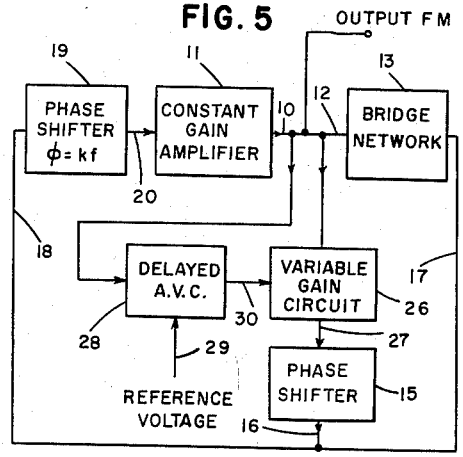
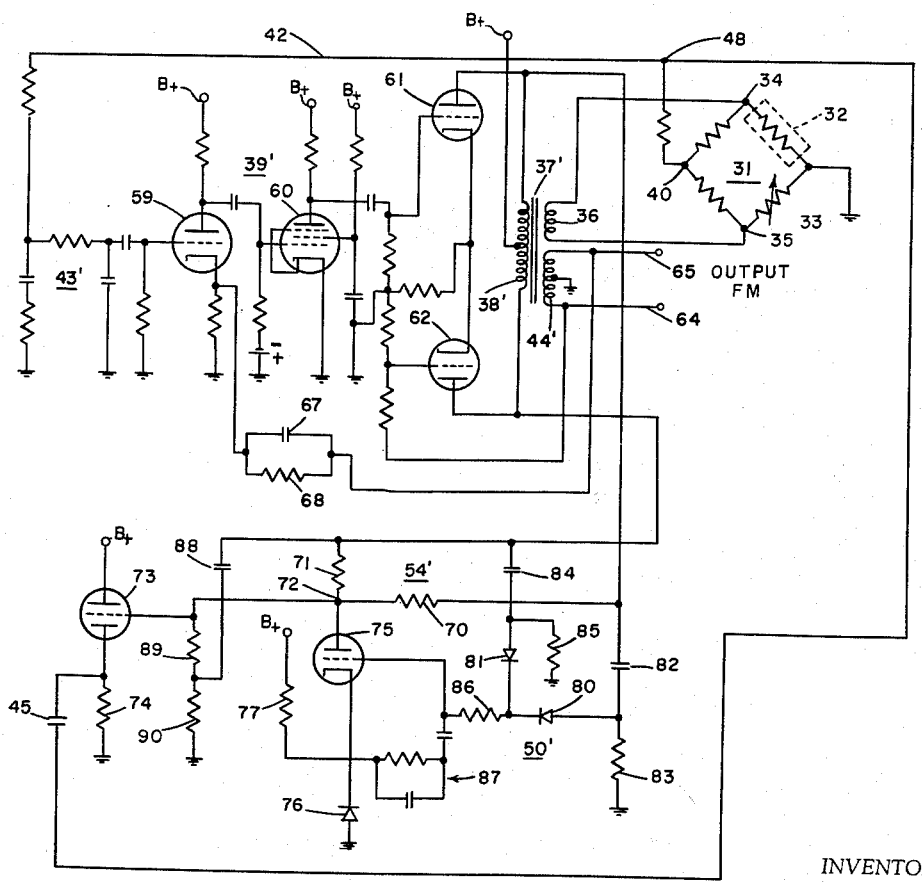
FIG. 6
INVENTOR.
RAYMOND A. RUNYAN
BY William R. Sherman
HIS ATTORNEY

United States Patent Office 2,923,893
Patented Feb. 2, 1960

2,923,893

AUTOMATICALLY STABILIZED OSCILLATOR CIRCUITS

Raymond A. Runyan, Ridgefield, Conn., assignor, by mesne assignments, to Schlumberger Well Surveying Corporation, Houston, Tex., a corporation of Texas Application May 1, 1957, Serial No. 656,373

8 Claims. (Cl. 332—27)

The present invention relates to automatically stabilized oscillator circuits, and more particularly, to new and improved oscillator circuits adapted to be frequency-modulated in accordance with resistive variations in the unbalance of a bridge circuit, and which must maintain good stability even in the presence of the considerable reactive variations usually associated with such bridge circuits. The present application is a continuation-in-part of my prior copending application Serial No. 403,-187, filed January 11, 1954, and entitled "Automatically Stabilized Oscillator Circuits," now abandoned.

For telemetering purposes, it has become accepted practice in connection with the transmission of data from remote strain gages for example, to couple a strain gage bridge into an oscillator circuit such that the oscillator is frequency-modulated in accordance with the unbalance of the bridge circuit and thus in accordance with the resistance variations of the strain gage in the bridge. However, in the past such oscillator circuits have not been completely satisfactory, and in fact, have been commercially unacceptable at the higher frequencies desirable for telemetering, as the result of the undesired frequency or sensitivity variations caused by variations in the stray capacitances associated with strain gage bridges.

It is a primary object of the present invention, accordingly, to provide automatically stabilized, frequency-modulated oscillator circuits particularly well adapted for use in connection with the transmission of data from remote bridge circuits.

A further object of the present invention is to provide strain gage oscillator circuits that are automatically compensated for variations in the stray capacitance associated with bridge circuits incorporating the strain gages.

These and other objects of the present invention are attained by providing an oscillator circuit including amplifying means and a feedback path therefor into which is coupled a resistive sensitive element adapted to frequency modulate said oscillator circuit. Amplitude variations in the feedback signal resulting from undesired reactive signal variations are detected and employed to automatically compensate the feedback path for said undesired signals, whereby the center frequency and the sensitivity of the oscillator circuit are substantially unchanged and the desired resistive signals from the sensitive element will cause the oscillator to be frequency-modulated in the desired manner.

More particularly, in a typical embodiment, the output of an amplifier is fed across the input diagonal of a resistive strain gage bridge. The relatively small unbalance signal, if any, from the opposite diagonal of the bridge is combined with a relatively large reactive signal, i.e., 90° out of phase with the output of the amplifier and thus 90° out of phase with the small resistive bridge unbalance signal, and fed back to the input of the amplifier through a network providing a phase shift that is variable as a function of frequency. In accordance with the well-known conditions for oscillation, this circuit will oscillate at the frequency where the phase shift in the feedback path is equal and opposite to the phase shift through the amplifier. Since resistive bridge unbalances will, in effect, vary the phase of the large combined signal in the feedback path of the amplifier, the frequency of oscillations will vary in accordance with the unbalance as a result of the frequency sensitive, phase shifting network maintaining the conditions for oscillation.

However, reactive unbalances of the bridge network caused, for example, by undesired variations of stray capacitance associated with the bridge will vary the amplitude of the large reactive feedback signal with which the unbalance signals are combined, and thus vary the sensitivity of the system, as well as the center frequency of the oscillations when a small, permanent resistive unbalance is incorporated in the bridge. In accordance with the present invention, the adverse effect of variations in stray capacitance is substantially eliminated. The amplitude of the large feedback signal is automatically controlled by a variable gain circuit in such a manner that the amplitude of said signal is maintained constant. Thus as stray capacitances tend to change the amplitude of the feedback signal, such changes are automatically corrected so that the frequency of the oscillator remains the predetermined function of the resistive unbalances of the bridge circuit.

These and other objects of the invention will be more fully understood with reference to the accompanying drawings in which:

Fig. 1 is a block diagram of a typical circuit constructed in accordance with the invention;

Fig. 2 is a vector diagram employed to explain the operation of the circuit described in connection with Fig. 1;

Fig. 3 is a detailed circuit diagram of a typical embodiment of the invention;

Fig. 4 is a block diagram of a modification of the circuit illustrated in Fig. 1;

Fig. 5 is a block diagram of another modification of the circuit illustrated in Fig. 1; and Fig. 6 is a detailed circuit diagram of the circuit illustrated in Fig. 5.

In Fig. 1, the output 10 of amplifier 11 is fed to the input 12 of a bridge circuit 13 designed to give an output 17, in phase with the input, which varies in accordance with the unbalance variations of the bridge. Output 10 of amplifier 11 is applied also to input 14 of phase shifter 15 supplying a phase shift, usually 90°, that is substantially constant in the frequency range involved. In conventional strain gage oscillators, the relatively large reactive output 16 of phase shifter 15 is combined directly with the relatively small resistive unbalance signal in the output 17 of bridge circuit 13. In practice the system is designed such that the reactive signal is at least five times greater in amplitude than the largest anticipated resistive unbalance signal. These combined signals are applied to the input 18 of the phase shifter 19 giving an output 20, the phase shift $\phi$ across which varies in a predetermined manner with frequency $f$ of the system. Output 20 is applied to the input of amplifier 11.

Assume that amplifier 11 has a phase shift of 180° between its input and output terminals 20 and 10 respectively, and that for the moment there is no unbalance signal in output 17 of strain gage bridge 13. This circuit will oscillate at the frequency at which phase shifter 19 supplies a phase shift such that the total phase shift supplied by phase shifters 15 and 19 will equal 180°, i.e., 90°.

If now a small resistive unbalance appears in the output 17 of bridge 13, the input 18 to phase shifter 19 will no longer be 90°. As shown in Fig. 2, phase shifter 15 causes the output signal 21 of amplifier 11 to be shifted 90° as shown by vector 22. However, the small resistive unbalance signal 23 combined with output signal 22 of phase shifter 15 causes the signal 24 input to phase shifter 19 to be shifted in phase by an amount $\theta$. Thus for oscillations to be maintained, the phase shift supplied across phase shifter 19 must change so that the total remains 180°. This will cause the frequency to vary since phase shift across phase shifter 19 is a function of frequency, and these variations in frequency are detected as a function of the resistive unbalance of the bridge 13.

If, however, there are present in the output 17 of bridge 13 the reactive variations usually associated with bridge circuits, as for example in connection with the stray capacitance in the cable leading to and from bridge circuit 13, an additional reactive signal 25 is added to reactive signal 22 in the input 18 to shifter 19. Thus resistive signal 23 no longer supplies the desired phase shift $\theta$, but rather a different phase shift $\theta'$. Accordingly, the sensitivity of the system varies and the frequency variations are no longer the predetermined function of the variations in the resistive unbalance of the bridge. Further, as is sometimes desirable in connection with this type of circuit, if a fixed, small unbalance is set in bridge 13, the center frequency of the oscillations will vary with variations in stray capacitance.

However, in accordance with the present invention the reactive output 16 of phase shifter 15 is applied to the input of a variable gain circuit 26. The output 27 of circuit 26 is then combined with the output 17 of bridge 13 and applied through shifter 19 to the input of amplifier 11, which has a constant gain for the frequency and amplitude ranges of interest. Variable gain circuit 26 is automatically controlled so that the amplitude of the output from amplifier 11 remains constant. To accomplish this, output 10 of constant gain amplifier 11 is fed to a delayed AVC circuit 28, so biased by a voltage 29 that said AVC circuit supplies a signal to gain control circuit 30 that varies when the output of amplifier 11 exceeds a predetermined level. Gain control circuit 30 thus varies the output of variable gain circuit 26 such that the input, and thus the output of constant gain amplifier 11 remains constant.

Referring again to Fig. 2, if any reactive signal 25 is now introduced from bridge circuit 13, such reactive signal will increase (or decrease) the amplitude of the large reactive signal 22 input to amplifier 11. Since amplifier 11 has a constant gain, its output 10 will be increased (or decreased) proportionally. This variation in the output signal of amplifier 11, which is applied to delayed AVC circuit 28, will introduce a control signal 30 to variable gain circuit 26, thus varying the output 27 until the output of amplifier 11 is again at the desired level. It should be noted that variations in the small resistive unbalance signal 23 will tend to vary slightly the amplitude of the signal 24 input to phase shifter 19. However, AVC circuit 28 will instantaneously correct this variation in amplitude, and thus the resistive unbalance 23 will affect only the phase $\theta$ of signal 24. Accordingly, it can be seen that undesired reactive signals from bridge 13 are automatically compensated while resistive unbalance signals affect only the frequency of the system, thus maintaining accurately the sensitivity and center frequency of the FM oscillator system.

In Fig. 3 is shown a representative circuit diagram of a typical embodiment of the invention, in connection with a strain gage bridge 31, shown schematically as a four resistance Wheatstone bridge including strain gage element 32 providing a resistance variable with strain. If desired, such bridges may be adjusted, as for example by variable resistance 33, to provide a small permanent unbalance so that variations in the resistance of strain element 32 act to increase and decrease the permanent unbalance. The bridge activating signal is supplied across diagonal 34—35 by means of secondary 36 of transformer 37, the primary 38 of which is coupled to the output of a conventional, constant gain amplifier 39. The small unbalance signal from bridge 31 is obtained across diagonal 40—41 and applied by means of conductor 42 through phase shifting network 43 to the input of amplifier 39.

In order to supply a large reactive signal, i.e., 90° out of phase with the output of amplifier 39, to the input of phase shifting network 43, a secondary winding 44 of transformer 37 is coupled to a capacitor 45 supplying a 90° phase shift in the frequency range of interest. This phase shifted signal is applied to an input 46 of variable gain amplifier 47, comprising a variable $\mu$ tube, the output of which is combined at junction 48 with the unbalance signal from bridge 31.

The output of amplifier 39 is also supplied by way of conductor 49 to the input of delayed AVC circuit 50. Rectifier 51 in AVC circuit 50 is biased by means of voltage divider network 52—53, such that when the output of amplifier 39 exceeds a predetermined level, a D.C. signal is applied through filter 54 to the control grid of variable gain amplifier 46.

In operation, assuming no reactive signal from strain gage bridge circuit 31, the entire circuit will oscillate about a center frequency in accordance with the variations of the resistive unbalance signal from strain element 32 in bridge 31. The center frequency is determined by network 43 which supplies a phase shift that varies as a function of frequency, and the phase shift of the large reactive signal from variable gain amplifier 47 (combined with the small permanent resistive signal, if any). If we assume that amplifier 39 has three stages such that the phase shift thereacross is 180°, and that the phase shift of the vector sum of the reactive signal from variable gain amplifier 47 and the small permanent, resistive unbalance signal from bridge 31 is 88°, the center frequency of the system will be that frequency at which the phase shift supplied by network 43 is 92°. As the resistive unbalance of bridge 31 is varied by strain element 32, the oscillator will be frequency-modulated in accordance therewith.

If now a reactive unbalance signal appears at junction 48 as a result for example of a variation in the stray capacitance associated with strain gage bridge 31, the amplitude of the signal input to amplifier 39 will increase, increasing proportionally the output of amplifier 39. As a result of AVC circuit 50, the bias on the control grid of variable gain amplifier 37 will change, thus varying the gain of said amplifier until the input and thus the output of amplifier 39 is returned to its original level. In practice this occurs almost instantaneously so that the oscillator maintains its sensitivity and center frequency at all times, regardless of variations in the reactive output associated with bridge 31.

The FM output signal from the oscillator may be obtained at 55 from the output of amplifier 39, and employed for example as a sub-carrier to modulate a carrier for transmission to a remote point. In practice, the center frequency of the system may be anywhere from 1000 cycles to 20,000 cycles or higher.

Many modifications of the foregoing will occur to those skilled in the art. For example, variable gain circuit 26 may be replaced by a variable attenuation circuit such as a potentiometer, servo-controlled by the error signal from AVC circuit 28. Also it is important only that the desired output from bridge network 13 be combined with, and 90° out of phase with, a large signal in the feedback circuit, and the relative phase of the large signal to the output signal of amplifier 11, and point of combination of the large signal with the unbalance signal, are unimportant. For example, the input 12 to bridge network 13 may be phase shifted 90° and phase shifter 15 removed. Also, phase shifter 19 may be coupled directly in the output 10 of amplifier 11 as illustrated in Fig. 4. The operation remains substantially the same as described above.

In Fig. 5 is illustrated a further modification which differs from the embodiment of Fig. 1 in that the phase shifter 15 is coupled in the output of the variable gain circuit 26 rather than to the input. The large, gain-controlled signal derived from the variable gain circuit 26 is, therefore, combined with, and 90° out of phase with, the desired output from bridge network 13.

A circuit diagram is illustrated in Fig. 6, in which the modification of Fig. 5 is incorporated. The same strain gage bridge 31 may be employed as was described in connection with Fig. 3. The activating signal for the bridge is supplied across diagonal 34—35 by means of secondary 36 of a somewhat modified transformer 37′, the primary 38′ of which is coupled to the output of a constant gain amplifier 39′ to be described. The small unbalance signal from bridge 31 is obtained across diagonal 40—41 and applied by means of conductor 42 through phase shifting network 43′ to the input of amplifier 39′.

The amplifier 39′ includes a triode input stage 59, a pentode 60 forming an intermediate amplification stage, and a pair of triodes 61, 62 having their plates connected to the terminals of the transformer primary 38′ to provide a push-pull output. The three stages 59, 60 and 61—62 are coupled in a conventional manner, the driving potential for the output triode 62 being derived from output terminal 64 of transformer secondary 44′. Of course, any other convenient source of driving signal inverted in relation to the driving signal applied to triode 61 might be employed. By virtue of a close coupling between the secondary windings 36 and 44′, phase and amplitude correspondence between the secondary voltages is ensured over the range of operating frequencies. Hence, by deriving a feedback potential with respect to ground from the remaining output terminal 65 of transformer secondary 44′ and applying such potential in degenerative feedback relation to the input stage 59 of the amplifier, both the phase and gain characteristics of the amplifier are made more constant over the operating frequency range. Capacitor 67 in parallel with resistor 68 may be incorporated in the feedback circuit for high frequency stabilization of the amplifier.

A positive feedback circuit for sustaining oscillations is provided between the output and input terminals of the amplifier 39′ by variable gain circuit 54′, phase shifting capacitor 45 supplying a 90° phase shift in the frequency range of interest, and a modified phase shifting circuit 43′, similar to circuit 43. That is to say, the output of the variable gain circuit 54′ coupled through the phase shifting capacitor 45 is combined at junction 48 with the unbalance signal from bridge 31 and coupled through phase shifting circuit 43′ to the input of the amplifier 39′.

To supply a signal unbalanced with respect to ground to the variable gain circuit 54′, the plates of output triode 61 and 62 are conveniently connected by asymmetrical or unequal resistors 70 and 71, respectively, to a junction point 72. For example, resistor 70 may be 180 kilohms and resistor 71, 100 kilohms. The junction point 72 is connected directly to the grid of a triode 73 forming a cathode follower output stage for the variable gain circuit. Thus, phase shifting capacitor 45 is connected to the junction of cathode resistor 74 and the cathode of output triode 73 to supply a signal to the junction point 48 which is in phase quadrature with the unbalance signal derived at junction 72 from the constant gain amplifier 39′.

In order to vary the gain (or attenuation, which is the reciprocal of gain) of the variable gain circuit 54′, a variable impedance tube 75 has its plate connected to junction 72 and its cathode connected through Zenar diode 76 to ground. A reverse current to maintain diode 76 at its Zenar operating point is supplied from the plate supply terminal B+ through resistor 77 so that the cathode of tube 75 is maintained at a substantially constant reference voltage with respect to ground.

To vary the amplitude of the signal at junction 72 which is applied to the cathode follower, the output of the constant gain amplifier 39′ is coupled through a delayed AVC circuit 50′ to the control grid of tube 75, thereby to vary its impedance. The AVC circuit includes a pair of diodes 80, 81 symmetrically coupled to the plates of push-pull triodes 61 and 62, respectively, by capacitor 82 and shunt resistor 83 and by capacitor 84 and shunt resistor 85. The diodes 80 and 81 are connected in common through a potential dividing network in series with the Zenar diode 76 and are poled for conduction toward ground. The potential dividing network includes resistor 86 and an RC compensating circuit 87 having their junction connected to the control grid of tube 75. Tube 75 is arranged so that, in the absence of oscillations at the output of constant gain amplifier 39′, the operation of the tube is nearly at cut-off and a maximum signal is transferred from the output of the constant gain amplifier to the phase shifting capacitor 45. To compensate for any phase lag in the variable gain circuit, the plate of output triode 62 is coupled through capacitor 88 and the junction of grid resistors 89, 90 to the control grid of cathode follower 73.

In operation, assuming no reactive signal from strain gage bridge circuit 31, the entire circuit will oscillate about a center frequency determined by the values of the capacitors in the phase shifting circuit 43′ and the capacitor 45. The variations about the center frequency are linearly related to the resistive unbalance signal from the strain gage bridge 31. Thus, the oscillatory output of the amplifier 39′, as developed, for example, across secondary terminals 64, 65, is frequency modulated in substantially the same manner as was described in conjunction with Fig. 3.

When account is taken of any reactive unbalance signal at junction 48, which may result, for example, from a variation in the stray capacitance associated with strain gage bridge 31, the amplitude of the signal input to amplifier 39′ will tend to change. Since the gain of the amplifier 39′ is maintained substantially constant over its operating frequency range, a proportional change in the output of amplifier 39 will tend to arise. However, any such change is translated by the AVC circuit 50′ into a change in the D.C. bias on the control grid of variable impedance tube 75. If the output increases, the D.C. bias increases, thereby reducing the impedance of the tube 75 and correspondingly reducing the signal applied to the cathode follower 73. If the output decreases, a compensating increase occurs in the signal applied to the cathode follower.

Hence, by the continuous operation of the AVC circuit, the amplitude of the signal at junction 48 is maintained substantially constant, thereby to render the overall circuit substantially insensitive to any variations in the reacive unbalance of bridge 31. The oscillator therefore maintains its sensitivity and center frequency at all times, so that its frequency modulated output accurately corresponds with variations in the resistive unbalance of the bridge.

The RC circuit 67, 68 in the feedback loop of the constant gain amplifier permits a high order of constancy in the gain and phase characteristics of the amplifier while stabilizing the overall circuit against instability at frequencies well above the operating frequencies. The RC compensating circuit 87 is similarly provided for purposes of stability, but serves to eliminate instability at low frequencies which might otherwise be associated with the AVC action applied to the variable gain circuit.

As the invention is susceptible to these and other modifications, it will be understood that the embodiments described above are not to be regarded as limiting the scope of the following claims.

I claim:

1. A system for providing a signal frequency modulated in accordance with the variations in the resistance of an element comprising substantially constant gain amplifying means, and a feedback circuit coupled between the output and input circuits of said amplifying means including means for providing a phase shift variable as a function of the frequency of the signal in said feedback circuit, means for coupling a variable resistance element into said feedback circuit, means connected in parallel with said coupling means for controlling the amplitude of the signal in said feedback circuit, the signal output of amplitude controlling means being large with respect to the signal output of said coupling means and 90° out of phase with the signal output of said coupling means resulting from resistance variations, means for detecting the amplitude of the combined signal from said resistance element and from said parallel means in said feedback circuit and coupled to said amplitude controlling means, to maintain the amplitude of said combined signal in said feedback circuit substantially constant.

2. A strain gage oscillator comprising a substantially constant gain amplifier circuit, and a feedback circuit coupled between the input and output terminals of said amplifier circuit including means for providing a phase shift variable as a function of the frequency of the signal in said feedback circuit, means for coupling a resistive strain gage bridge into said feedback circuit, means connected in parallel with said coupling means for controlling the amplitude of the signal in said feedback circuit, the output signal of said coupling means due to resistive variations in said bridge being small relative to the output signal of said amplitude controlling means and 90° out of phase therewith, means for detecting the amplitude of the combined signal from said bridge and from said parallel means in said feedback circuit and coupled to said amplitude controlling means, to maintain the amplitude of said combined signal in said feedback circuit substantially constant.

3. In an electrical oscillator circuit including amplifying means and a feedback path coupled between the output and input terminals of said amplifying means, coupling means in said feedback path adapted to be connected to an element providing an intelligence-bearing signal of one phase, amplitude varying means connected in parallel with said coupling means for varying the amplitude of the signal passing therethrough and providing an output signal substantially 90° out of phase with and substantially larger than said intelligence-bearing signal, means for sensing the amplitude of the combined signal from said coupling means and said amplitude varying means at a given point in said feedback path, and means connected to said sensing means for controlling said amplitude varying means to maintain substantially constant the amplitude of said combined signal.

4. In an electrical oscillator circuit including amplifying means and a feedback path coupled between the output and input terminals of said amplifying means, coupling means in said feedback path adapted to be connected to an element providing an intelligence-bearing signal in the output thereof substantially in phase with the signal applied to the input thereof, a circuit in parallel with said coupling means providing an output signal substantially 90° out of phase with and substantially larger than said intelligence-bearing signal, said circuit including variable gain means for varying the amplitude of the signal passing through said circuit, means for sensing the amplitude of the combined signal from said coupling means and said parallel circuit at a given point in said feedback path, and means connected to said sensing means for controlling said variable gain means to maintain substantially constant the amplitude of said combined signal.

5. In an electrical oscillator circuit, substantially constant gain amplifying means and a feedback path coupled between the output and input terminals of said amplifying means, said feedback path comprising: means providing a phase shift as a function of frequency, coupling means adapted to be connected to an element providing an intelligence-bearing signal in the output thereof substantially in phase with the signal applied to the input thereof, a circuit in parallel with said coupling means providing an output signal substantially 90° out of phase with and substantially larger than said intelligence-bearing signal, said circuit including variable gain means for varying the amplitude of the signal passing through said circuit, means for sensing the amplitude of the combined signal from said coupling means and said parallel circuit at a given point in said feedback path, and means connected to said sensing means for controlling said variable gain means to maintain substantially constant the amplitude of said combined signal.

6. In an electrical oscillator circuit, substantially constant gain amplifying means, and a feedback path coupled between the output and input terminals of said amplifying means, said feedback path comprising: means for providing a phase shift as a function of frequency, coupling means adapted to to be connected to a sensing element providing an intelligence-bearing signal in the output thereof substantially in phase with the signal applied to the input thereof, a circuit in parallel with said coupling means providing an output signal substantially 90° out of phase with and substantially larger than said intelligence-bearing signal, said circuit including a variable gain amplifier, means for detecting the amplitude of the combined signal from said coupling means and parallel circuit at a given point in said feedback path, and means connecting said detecting means and a gain control grid of said variable gain amplifier for maintaining substantially constant the amplitude of said combined signal.

7. In an electrical oscillator circuit, substantially constant gain amplifying means, and a feedback path between the output and input terminals of said amplifying means comprising means for providing a phase shift as a function of frequency, coupling means adapted to be connected to an element providing an output signal, the amplitude of which varies as a function of intelligence and which is substantially in phase with the input signal to said element, a circuit in parallel with said coupling means adapted to provide an output signal of amplitude large with respect to said amplitude varying signal and substantially 90° out of phase therewith, said circuit including a variable gain amplifier, means for detecting the amplitude of the combined signal from said coupling means and parallel circuit, and means connecting said detecting means to a gain control element of said variable gain amplifier to maintain the amplitude of said combined signal substantially constant.

8. In an electrical oscillator circuit, substantially constant gain amplifying means and positive feedback circuit means connecting the output of said amplifying means to the input thereof and defining with said amplifying means a closed loop circuit, amplitude modulating means separate from said loop circuit and coupled therewith for controlling the frequency of oscillation in substantially linear correspondence with a modulating intelligence, reactive means in said loop circuit for supplying a quadrature signal in parallel with the output signal of said amplitude modulating means to sustain said oscillations, and means in said feedback circuit responsive to the combined signal from said modulating and reactive means for controlling the amplitude of the quadrature signal supplied by said reactive means so as to maintain the amplitude of said combined signal substantially constant.

References Cited in the file of this patent

UNITED STATES PATENTS 2,782,311   Colander et al. _____ Feb. 19, 1957